(12) United States Patent
Jess

(10) Patent No.: US 10,953,478 B2
(45) Date of Patent: Mar. 23, 2021

(54) COLLET COMPRISING A SEAL

(71) Applicant: JBS System GMBH, Kronshagen (DE)

(72) Inventor: Maik Jess, Kronshagen (DE)

(73) Assignee: JBS System GMBH, Kronshagen (DE)

( * ) Notice: Subject to any disclaimer, the term of this patent is extended or adjusted under 35 U.S.C. 154(b) by 0 days.

(21) Appl. No.: 16/652,518

(22) PCT Filed: Aug. 8, 2018

(86) PCT No.: PCT/DE2018/100698
§ 371 (c)(1),
(2) Date: Mar. 31, 2020

(87) PCT Pub. No.: WO2019/072332
PCT Pub. Date: Apr. 18, 2019

(65) Prior Publication Data
US 2020/0238394 A1 Jul. 30, 2020

(30) Foreign Application Priority Data
Oct. 12, 2017 (DE) ..................... 10 2017 123 811.5

(51) Int. Cl.
*B23B 31/20* (2006.01)
*B23B 31/00* (2006.01)

(52) U.S. Cl.
CPC ............ *B23B 31/20* (2013.01); *B23B 31/001* (2013.01); *B23B 2231/36* (2013.01); *Y10T 279/17376* (2015.01); *Y10T 279/17384* (2015.01)

(58) Field of Classification Search
CPC .................. B23B 31/001; B23B 31/20; Y10T 279/17376; Y10T 279/17384; Y10T 279/17471; Y10T 279/17478
See application file for complete search history.

(56) References Cited

U.S. PATENT DOCUMENTS

| | | | |
|---|---|---|---|
| 2,346,706 A | | 4/1944 | Stoner |
| 2,448,423 A | * | 8/1948 | Dodge ................... B23Q 11/08 279/51 |
| 2,557,301 A | * | 6/1951 | Lundy ................... B23B 31/001 279/46.9 |
| 2,608,414 A | * | 8/1952 | Montgomery ........ B23B 31/001 279/51 |
| 2,631,860 A | * | 3/1953 | Bronson ............... B23B 31/001 279/56 |
| 3,022,082 A | | 2/1962 | Haviland |
| 3,539,193 A | | 11/1970 | Parsons |
| 4,155,563 A | * | 5/1979 | Shupp ................... B23B 31/202 279/151 |

(Continued)

FOREIGN PATENT DOCUMENTS

CN 105772773 7/2016

*Primary Examiner* — Eric A. Gates
(74) *Attorney, Agent, or Firm* — Diederiks & Whitelaw, PLC.

(57) ABSTRACT

A collet includes a plurality of clamping jaws movable relative to one another, at least one recess provided in one of mutually facing side faces of adjacent clamping jaws, and a spring inserted into each recess and supporting the adjacent clamping jaws resiliently relative to one another, and a seal sealing the gap between two side faces of adjacent clamping jaws, with the said seal having a fastening portion engaging in the at least one recess.

14 Claims, 2 Drawing Sheets

(56) References Cited

U.S. PATENT DOCUMENTS

| | | | | |
|---|---|---|---|---|
| 4,309,041 A | * | 1/1982 | Peterson | B23B 31/202 |
| | | | | 279/46.7 |
| 4,657,454 A | * | 4/1987 | Migita | B23B 31/117 |
| | | | | 409/234 |
| 4,858,938 A | | 8/1989 | Terwilliger et al. | |
| 5,096,213 A | | 3/1992 | Terwilliger et al. | |
| 5,641,168 A | * | 6/1997 | Kanaan | B23B 31/001 |
| | | | | 279/156 |
| 5,997,010 A | * | 12/1999 | Lloyd | B23B 31/202 |
| | | | | 279/157 |
| 6,726,221 B2 | | 4/2004 | Terwilliger et al. | |
| 6,746,023 B2 | * | 6/2004 | Komine | B23B 31/202 |
| | | | | 279/20 |
| 6,908,086 B2 | * | 6/2005 | Rall | B23B 31/202 |
| | | | | 279/43.7 |

* cited by examiner

COLLET COMPRISING A SEAL

CROSS-REFERENCE TO RELATED APPLICATIONS

This application represents the U.S. National Phase of International Application number PCT/DE2018/100698 entitled "Collet Comprising a Seal" filed Aug. 8, 2018, which claims benefit to German Patent Application number 10 2017 123 811.5 filed Oct. 12, 2017, all of which are incorporated herein by reference.

BACKGROUND OF THE INVENTION

The invention relates to a guide clamp or collet. In particular, the invention relates to a collet having a plurality of clamping jaws which are movable with respect to one another, at least one recess provided in one of the mutually facing side faces of adjacent clamping jaws, and in each case a spring inserted into a recess which resiliently loads the adjacent clamping jaws with respect to one another.

Collets of this kind are known from DE 20 2013 010 357 U1, DE 10 2014 018 695 B4, DE 93 20 515 U1 and DE 19 07 956 B2, for example.

A problem with all known collets is that during machining of workpieces, chips can enter the gaps and contact surfaces of the particular collet. This leads to functional restrictions by blocking the freedom of movement of the clamping jaws, insufficient concentricity and changed alignment of the workpiece, increased wear to the collet, and reduced clamping forces.

This problem is particularly prevalent in longitudinal turning machines, as machining on these machines takes place in the immediate vicinity of the collet. A particularly serious issue is the production of very fine chips which build up and settle in narrow gaps, undercuts, blind holes, etc.

SUMMARY OF THE INVENTION

It is therefore the object of the invention to produce a collet which retains its functionality despite the circumstances arising specifically in longitudinal turning machines and the influence of chips.

The basic concept of the invention is to introduce a seal into each gap formed by two adjacent clamping jaws, which gap, for fastening to the collet, uses the recesses that are already provided in the clamping jaws for receiving the springs. The seal is in particular made of a resilient material. In this case, the function of the present springs remains intact, as although the seal engages in the recess, as a hollow cylinder it accommodates the spring without impairment. According to a particularly preferred embodiment, the seal even replaces the spring, as the fastening portion is designed as a spring or a resilient cylinder that is inserted into the recess.

According to the invention, a collet is therefore provided which has a plurality of clamping jaws which are movable with respect to one another, at least one recess provided in one of the mutually facing side faces of adjacent clamping jaws, in each case a spring inserted into a recess which resiliently loads the adjacent clamping jaws with respect to one another, and in each case a seal sealing the gap between two side faces of adjacent clamping jaws, said seal having in each case a fastening portion that engages in the at least one recess of a side face.

The fastening portion of the seal is preferably designed as a hollow cylinder accommodating the spring. This embodiment makes it possible, in a particularly simple manner, to retrofit existing clamping jaws with the seal without further adaptations being necessary. The existing springs are simply inserted into the fastening portion, designed as a hollow cylinder of the seals and can perform their function without being impeded by the seal.

Alternatively, it can preferably be the case that the fastening portion itself is designed as a spring. In the case of retrofitting existing clamping jaws, this would therefore mean that existing springs can be exchanged for the preferably designed seals according to the invention, as the fastening portion formed in one piece with the seal is designed as a spring.

On the other hand, a simple, but highly advantageous embodiment is achieved if the fastening portion is designed as a resilient cylinder. This fastening portion can be readily inserted into the conventionally provided recesses of the clamping jaws. The resilient cylinder assumes the function of a fastening element of the seal on a clamping jaw or on adjacent clamping jaws and also, due to its resilience, the function of a spring element which resiliently loads the clamping jaws with respect to one another.

The resilient cylinder can comprise one or more (resilient) structures which extend radially from the cylinder and are used to anchor the cylinder and therefore the seal in the recesses of the clamping jaws. These structures rest in the recess against the wall of the recess. For example, these structures may, in a circular cylinder, be designed as rings extending from the surface of the cylinder.

The outer contour of the seal preferably corresponds to the outer profile of the side faces of the clamping jaws, such that chips that occur during machining cannot enter the gap between the clamping jaws.

More preferably, the seal fully fills the gap between two side faces of adjacent clamping jaws. Due to this preferred embodiment, the seal can be produced very easily while maintaining tight tolerances. In addition, connection of the fastening portion as an integral component of the seal over the entire surface is also advantageous with regard to the even distribution of forces occurring during use if the seal is designed over the entire surface.

Alternatively, it is also possible for the outer contour of the seal to be connected to the fastening portion by means of connecting parts. This embodiment has the advantage that only a small amount of material needs to be inserted between the clamping jaws as required for sealing the gap and does not need to be overcome in the event of a relative movement of the jaws with respect to one another.

This is particularly advantageous when the seal comprises a sealing lip extending from the plane of the seal. The sealing lip is particularly preferably arranged on the edge of the seal and specifically follows the outer contour of the seal.

The fastening portion and/or the sealing lip extend in particular on both sides of the plane of the seal, so that the seal is particularly preferably mirror-symmetric with respect to the gap plane between the clamping jaws. If the seal therefore comprises two opposing fastening portions, said portions engage in or are inserted into opposite recesses of the opposite side faces of adjacent clamping jaws. Sealing lips extending on both sides of the seal are therefore supported on the opposing side faces of adjacent clamping jaws.

The collet according to the invention comprises preferably three clamping jaws.

Finally, it appears to be advantageous for the seal to be made in particular of an elastomer material and specifically to be produced by injection molding or 3D printing.

BRIEF DESCRIPTION OF THE DRAWINGS

The invention is explained in greater detail in the following with reference to a particularly preferred embodiment which is shown highly schematically in the accompanying drawings, in which.

DETAILED DESCRIPTION OF THE INVENTION

Figure 1:
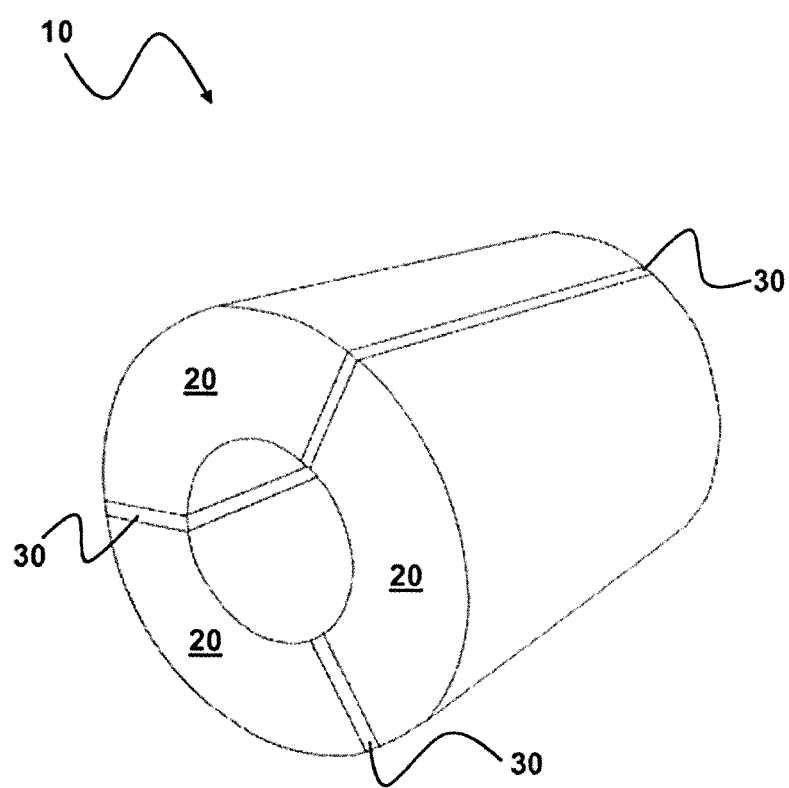
FIG. 1 is a perspective view of a particularly preferred design of a collet according to the invention.

FIG. 1 is, by way of example, a perspective view of a particularly preferred design of a tensile clamp according to the invention, e.g. double cone clamps. Although the invention is explained in greater detail with reference to this specific kind of collet, the invention is in principle suitable for any kind of collet or guide clamp. Although an element that holds the collets together is not shown for reasons of clarity, it goes without saying that, for this purpose, the clamping jaws must be movable with respect to one another but must not come apart completely.

The collet 10 shown comprises a plurality of, namely three, clamping jaws 20 which are movable with respect to one another. The gap formed between each of the clamping jaws 20, which gap is formed between two side faces of adjacent clamping jaws 20, is sealed on all sides by a seal 30 in each case, and therefore chips produced during machining cannot enter the gap.

Figure 2:
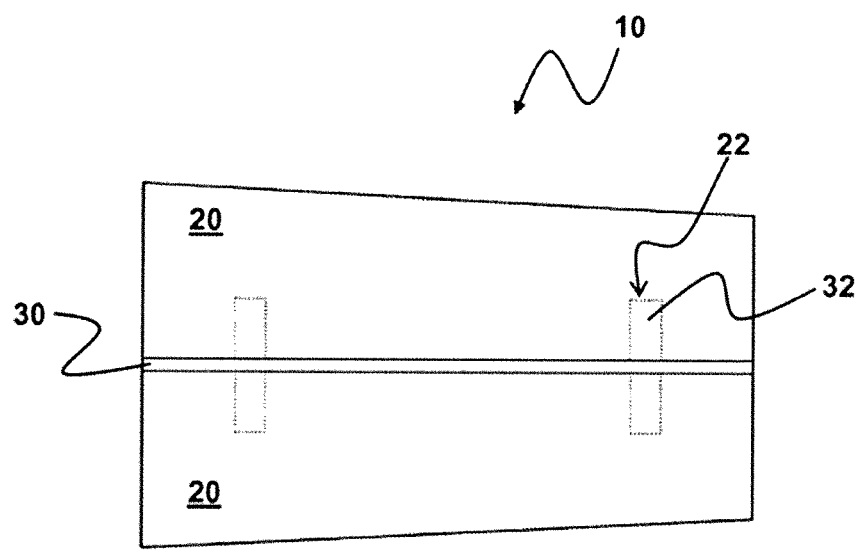
FIG. 2 is a schematic side view of the collet from FIG. 1.

The seal 30 is, as shown in FIG. 2, fastened to the collet 10 by the fastening portions 32 engaging in the recesses 22 arranged in the side faces of adjacent clamping jaws 20.

In the example shown, the fastening portions 32 are designed in particular as cylinders which are resilient at least in the direction of their longitudinal axis and therefore have spring-loading properties. In this particularly preferred embodiment, the fastening portions 32 therefore replace the screw springs that are conventionally used according to the prior art.

Figure 3:
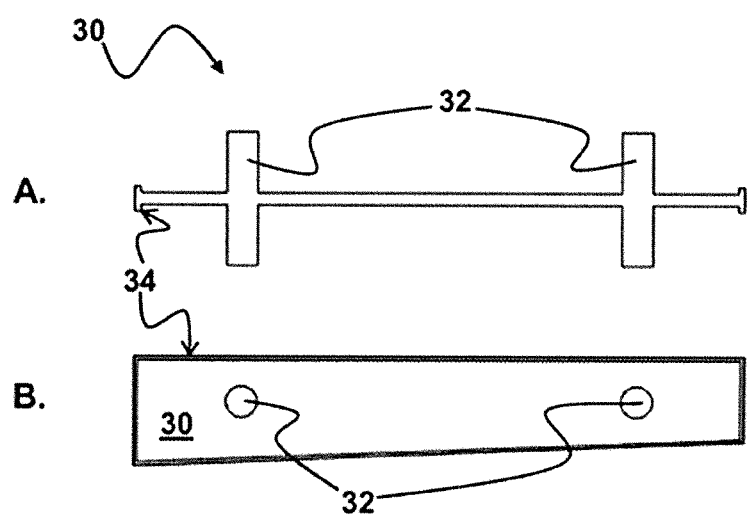
FIG. 3 shows a particularly preferred design of a seal for use in the previously shown collet in a sectional view (A) and in a plan view (B).

Finally, FIG. 3 shows the particularly preferred design of the seal 30 in a sectional view (A) and in a plan view (B). The seal is mirror-symmetric in particular with respect to the gap plane between the clamping jaws 20 and has a sealing lip 34 which extends on both sides of the gap plane or on both sides of the seal 30.

The sealing lip 34 in particular extends around the seal 30. Additional sealing lips (not shown) can be arranged within the circumference occupied by the sealing lip 34, which additional sealing lips can optionally prevent chips which have passed the sealing lip 34 from penetrating into the recesses 22 of the clamping jaws. For this purpose, the fastening portions 32 can in particular be surrounded by an additional sealing lip protecting the cylindrical portion thereof.

The present invention is suitable in particular for retrofitting existing collets, whether these have screw springs or leaf springs, provided that their clamping jaws have a recess for fastening the springs. In addition, the invention is of course also suitable for producing new collets according to the invention.

The invention claimed is:

1. A collet comprising
   a plurality of clamping jaws which can be moved with respect to one another,
   at least one recess provided in one of the mutually facing side faces of adjacent clamping jaws,
   in each case, a spring inserted into the at least one recess resiliently loads the adjacent clamping jaws with respect to one another, and
   a seal sealing the gap in each case between two side faces of adjacent clamping jaws, the seal having a fastening portion engaging in the at least one recess, wherein the fastening portion is designed as a hollow resilient cylinder accommodating the spring.

2. The collet according to claim 1, wherein the outer contour of the seal corresponds to the outer profile of the side faces of the clamping jaws.

3. The collet according to claim 1, wherein the seal fully fills the gap between two side faces of adjacent clamping jaws.

4. The collet according to claim 1, wherein the seal comprises a sealing lip extending from the plane of the seal.

5. The collet according to claim 4, wherein the sealing lip is arranged on the edge of the seal.

6. The collet according to claim 1, wherein the seal is mirror-symmetric with respect to the gap plane between the clamping jaws.

7. The collet according to claim 1, wherein the plurality of clamping jaws includes three clamping jaws.

8. A collet comprising
   a plurality of clamping jaws which can be moved with respect to one another,
   at least one recess provided in one of the mutually facing side faces of adjacent clamping jaws,
   in each case, a spring inserted into the at least one recess resiliently loads the adjacent clamping jaws with respect to one another, and
   a seal sealing the gap in each case between two side faces of adjacent clamping jaws, the seal having a fastening portion engaging in the at least one recess, wherein the fastening portion is designed as a hollow cylinder and wherein the fastening portion is designed as a spring.

9. The collet according to claim 8, wherein the outer contour of the seal corresponds to the outer profile of the side faces of the clamping jaws.

10. The collet according to claim 8, wherein the seal fully fills the gap between two side faces of adjacent clamping jaws.

11. The collet according to claim 8, wherein the seal comprises a sealing lip extending from the plane of the seal.

12. The collet according to claim 11, wherein the sealing lip is arranged on the edge of the seal.

13. The collet according to claim 8, wherein the seal is mirror-symmetric with respect to the gap plane between the clamping jaws.

14. The collet according to claim 8, wherein the plurality of clamping jaws includes three clamping jaws.

\* \* \* \* \*